United States Patent [19]

Takada

[11]  4,257,625
[45]  Mar. 24, 1981

[54] INPUT COUPLING TO A MOTION AMPLIFIER FOR USE IN DOOR-ACTUATED SEAT BELT SYSTEMS

[76] Inventor: Juichiro Takada, 3-12-1, Shinmachi, Setagayaku Tokyo, Japan

[21] Appl. No.: 32,340

[22] Filed: Apr. 23, 1979

[30] Foreign Application Priority Data

Oct. 31, 1978 [JP] Japan ................................. 53/133241
Nov. 17, 1978 [JP] Japan ................................. 53/141062
Dec. 25, 1978 [JP] Japan ........................... 53/176000[U]

[51] Int. Cl.$^3$ ............................................. B60R 21/10
[52] U.S. Cl. .................................... 280/804; 297/469
[58] Field of Search ....................... 280/803, 804, 802; 180/286, 268; 297/469

[56] References Cited

U.S. PATENT DOCUMENTS

| 3,583,726 | 6/1971 | Lindblad | 280/804 |
| 3,831,971 | 8/1974 | Kaneko | 280/802 |
| 3,882,955 | 5/1975 | Kaneko | 280/803 |

FOREIGN PATENT DOCUMENTS

| 2245802 | 4/1973 | Fed. Rep. of Germany | 280/803 |
| 2308980 | 9/1974 | Fed. Rep. of Germany | 280/802 |
| 2511496 | 9/1976 | Fed. Rep. of Germany | 280/804 |

*Primary Examiner*—John P. Silverstrim
*Attorney, Agent, or Firm*—Brumbaugh, Graves, Donohue & Raymond

[57] ABSTRACT

A passive occupant restraint belt system for a vehicle which includes a restraining belt and apparatus for moving the belt between occupant-restraining and occupant-releasing positions in response to partial opening of a door of the vehicle. A belt transfer device engages the seat or shoulder belt for moving the belt from the retraining to the releasing position and is actuated by a motion transmission mechanism which transmits and amplifies door opening motions to the belt transfer device. The transmission includes a motion amplifier mounted on either the vehicle body or door, and a force transmitting input rod having one end coupled to an input component of the motion amplifier. The other end of the rod engages a coupler mounted on the other of the vehicle body or door, the coupling arrangement such that the rod is connected when the door is between closed and partway open to transmit opening and closing motions of the door to the motion amplifier thereby to move the belt transfer device between its releasing and restraining positions. The rod, however, is disconnected from the door or body when the door is between partway open and fully open, such that the door may be fully opened without further actuating the belt transfer mechanism. The coupler for engaging the input rod also includes an emergency releasing feature for permitting the door to open when the belt transfer mechanism or amplifier is inoperative and thereby bound up.

8 Claims, 19 Drawing Figures

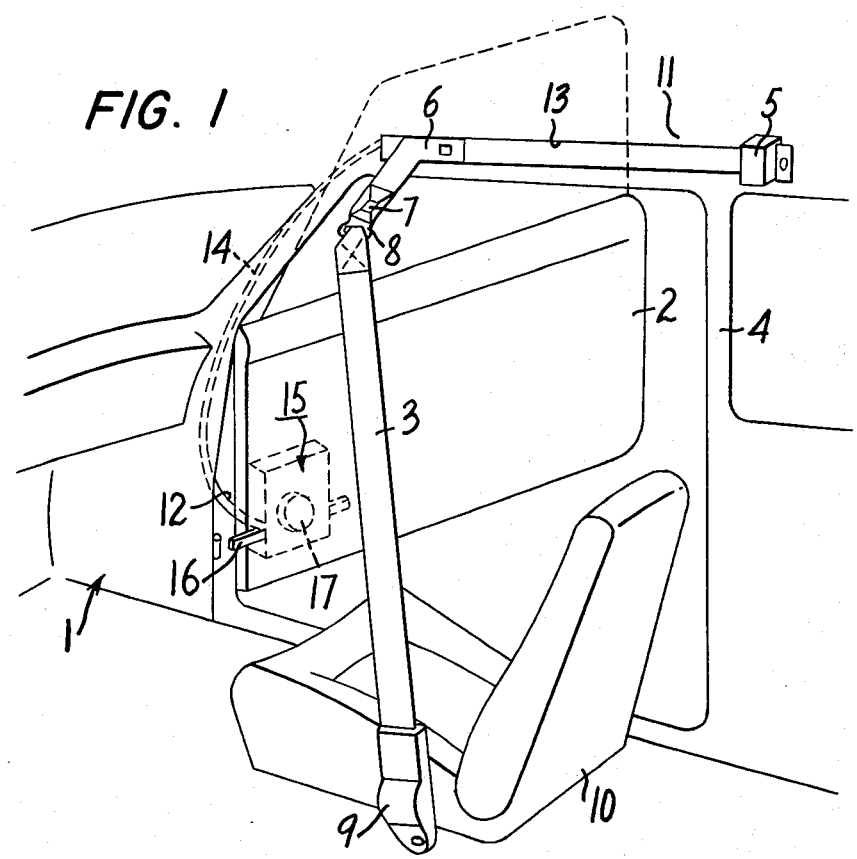
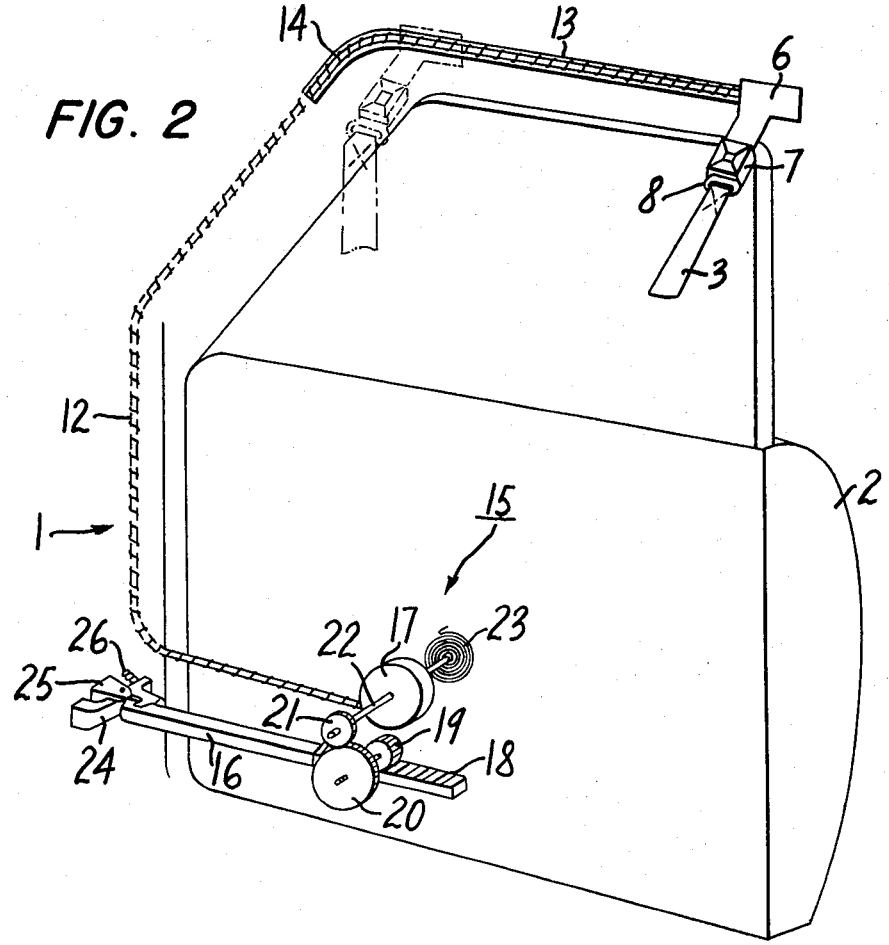

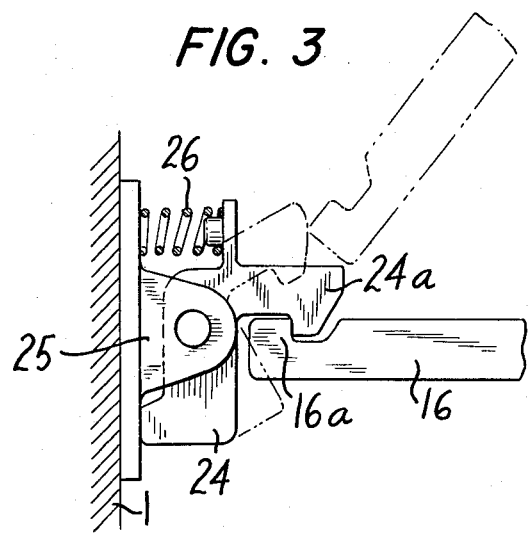
FIG. 3
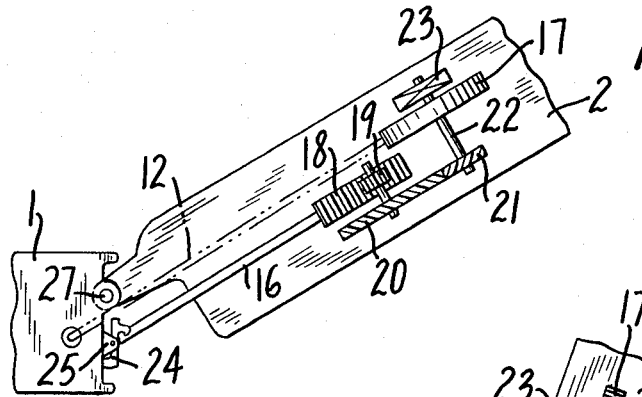
FIG. 4
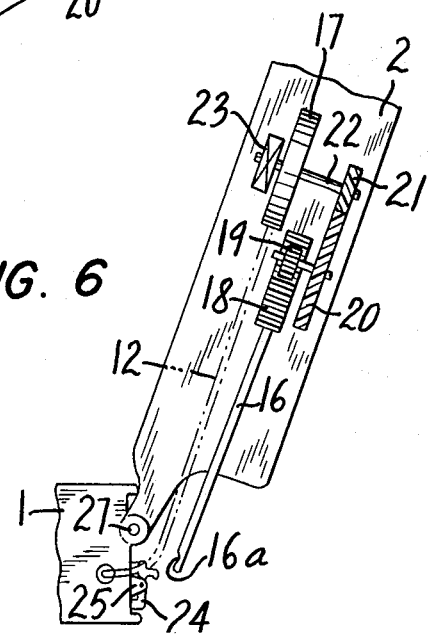
FIG. 5
FIG. 6

INPUT COUPLING TO A MOTION AMPLIFIER FOR USE IN DOOR-ACTUATED SEAT BELT SYSTEMS

BACKGROUND OF THE INVENTION

This invention relates to a passive vehicle occupant restraint belt system in which the belt is automatically, easily, and effectively transferred between an occupant-restraining and an occupant-releasing configuration in response to opening and closing movements of a vehicle door.

In recent years there have been many proposals for passive occupant restraint belt systems for vehicles. The most common type are those based on restraint belts, and most of the proposed belt systems include a belt transfer mechanism which is driven by an electric motor or a mechanical lever or gear transmission. In the case of mechanical drives, a motion transmitter is coupled between the belt transfer device and the vehicle body or door for transmitting and amplifying the door opening and closing movements. One such mechanical device, which is capable of moving the restraint belt between the occupant-restraining and occupant-releasing positions in response to a partial opening of the door is shown and described in commonly-owned U.S. Patent Application Ser. No. 950,020 filed Oct. 10, 1978.

As described in the aforementioned U.S. application, a passive restraint belt system in which the restraining belt can be moved between restraining and releasing positions in response to only a partial opening of the vehicle door is preferred. Since the motion transmitter, however, remains coupled to the belt transfer mechanism during the entire door opening movement, the remainder of the door opening movement must be absorbed within the coupling mechanism. This normally requires a complicated mechanism, such as the folding linkage described in U.S. application Ser. No. 950,020. Moreover, mechanisms of this type possess the disadvantages that in the case of accident where the input amplifier or belt transfer mechanism is damaged and thereby unable to move, there may be difficulty encountered in attempting to open the vehicle door.

A greatly simplified mechanism which overcomes these shortcomings is shown and described in commonly-owned U.S. patent application Ser. No. 45,172, filed June 4, 1979; entitled "Input Motion Coupling to a Motion Amplifier for Use in Door-Actuated Passive Seat Belt System." A mechanism is described for transmitting opening and closing motions of the door to the motion amplifier which includes an extendable rod, one end of which is coupled to the motion amplifier and the other end of which, through the action of a spring, engages a bearing surface on the vehicle body or door. The rod moves between a retracted position and an extended position when the door is moved between closed and partway open to move the belt between occupant-restraining and occupant-releasing positions. When the door is moved between partway open and fully open, the rod, which is fully extended, moves away from the bearing surface such that no further door movement is transmitted to the amplifier.

SUMMARY OF THE INVENTION

There is provided, in accordance with the present invention a passive vehicle occupant restraint belt system which includes apparatus for moving a restraining belt between occupant-restraining and occupant-releasing positions in response to partial opening and closing movements of the vehicle door. The apparatus moves the belt by transmitting and amplifying the opening and closing motions of the door to a belt transfer device, such as a wire, a racked wire, or a tape connected to a transfer guide which engages the belt. An input rod is coupled between the amplifier, mounted on either the door or vehicle body, and the other of the door and vehicle body to transmit the opening and closing motions when the door is between closed and partway open, and to disengage when the door is between partway and fully open to permit the door to move freely without actuating the motion amplifier.

At the same time, the rod and coupler mechanism is simple in construction, provides a smooth opening and closing of the door, is economical to manufacture and easy to install, and is reliable. As in the case of the extendible rod and bearing spring arrangement, described above, the input rod is released from engagement with the vehicle door or body when the door is between partway open to fully open, but in the present invention door closing movement is smoother and requires less force since there is no actuating spring to be compressed.

More particularly, the rod and coupling mechanism according to the present invention includes an input rod coupled at one end to an input component of the motion amplifier, and having a projection at its other end for engaging a coupler on the vehicle door when the amplifier is mounted to the vehicle body, or on the vehicle body when the amplifier is mounted in the door. The projection and coupler remain engaged when the door is between closed and partway open positions to actuate the motion amplifier and move the belt between the restraining and releasing positions, and disengage such that the rod moves away from the coupler when the door is moved between the partway open to fully open positions, the motion amplifier not being further actuated. As the door is again closed, the projection engages the coupler so that upon further door closing movement the amplifier moves the belt transfer guide to move the belt back to its restraining position.

In one embodiment of the invention, the rod has a tenon at one end which pivots into and out of engagement with a latch, depending upon the position of the door. In a further refinement of this embodiment, the latch is itself pivotable against the force of the spring, so that if the amplifier mechanism or belt transfer device were damaged and were to bind, the door would still open, since the latch pivots out of the way against the force of the spring to permit the tenon to uncouple and the rod to move away.

In another embodiment of the invention, a tenon on the end of the rod is received in a coupler having a pair of spring-loaded jaws. When the door is between closed and partway open, the jaws hold the tenon, and the amplifier is actuated to move the belt between the restraining and releasing positions. When the door opening angle reaches approximately 30°, the jaws release the tenon, and the door is free to open completely without further actuating the amplifier.

In another form of the invention, the end of the rod has a projecting pin which is received in a yoke attached to the vehicle body or door. One prong of the yoke is designed so that the pin is engaged in the yoke when the door is between closed and partway open position, but swings out of the yoke when the door is between partway open and fully opened positions. The yoke may be pivotally attached at one end to the body or door, with its other end spring-held, so that in emergency situations, where the amplifier or belt transfer mechanism has bound, the yoke snaps out of the spring and pivots to release the pin to allow the door to open, notwithstanding the inability of the rod to move relative to the amplifier.

In another embodiment of the invention, a cylindrical enlarged end on the rod is captured between locking rollers on two pivotable, spring-loaded arms of a coupler. Locking rollers on the arms trip the enlarged end in the coupler when the door is between closed and partway opened positions. After the door has reached the partway open position, and the rod has pivoted a corresponding angle, the arms are forced open and release the enlarged end. As the enlarged end retracts, a spring-loaded spacer plate engages the arms and keeps the rollers apart until, upon closing motion of the door, the enlarged end of the rod is reinserted.

For a better understanding of the invention, reference is made to the following detailed description of the preferred embodiments, taken in conjunction with the drawings accompanying the application.

BRIEF DESCRIPTION OF THE DRAWINGS

FIG. 1 is a pictorial, schematic view of a passive occupant belt restraint system exemplary of those in which the invention is useful;

FIG. 2 is a pictorial, schematic illustration of a belt transfer device, motion amplifier and input rod for use with various belt restraint systems such as that shown in FIG. 1;

FIG. 3 is a plan view of one embodiment of an input rod and coupling mechanism;

FIGS. 4 to 6 illustrate the operation of the rod and coupling mechanism shown in FIG. 3 during various stages of door opening and closing movement;

DETAILED DESCRIPTION OF THE PREFERRED EMBODIMENTS

Figure 7:
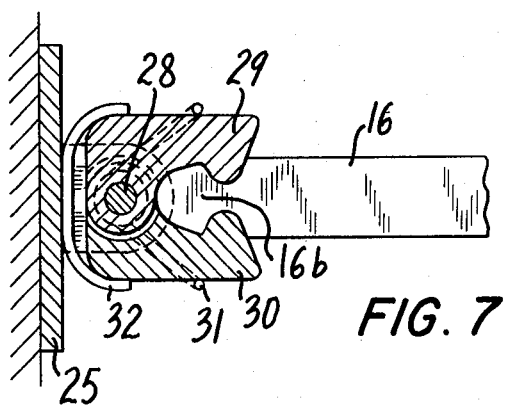
FIGS. 7 and 8 are top and end views, respectively, of another input rod and coupling mechanism embodying the present invention.
Figure 8:
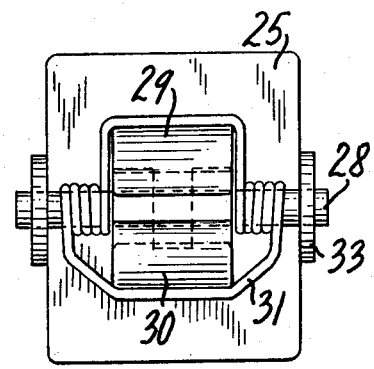
Figure 9:
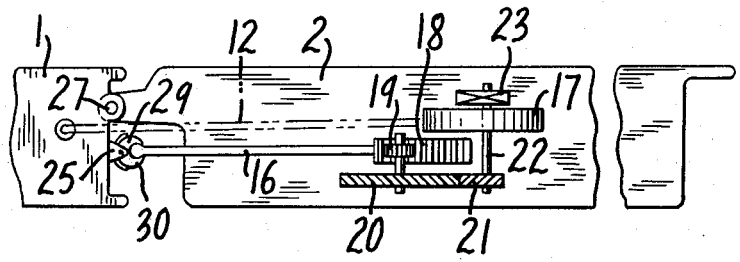
FIGS. 9 to 11 illustrate the operation of the rod and coupling mechanism shown in FIGS. 7 and 8 during various stages of door opening and closing movement.
Figure 10:
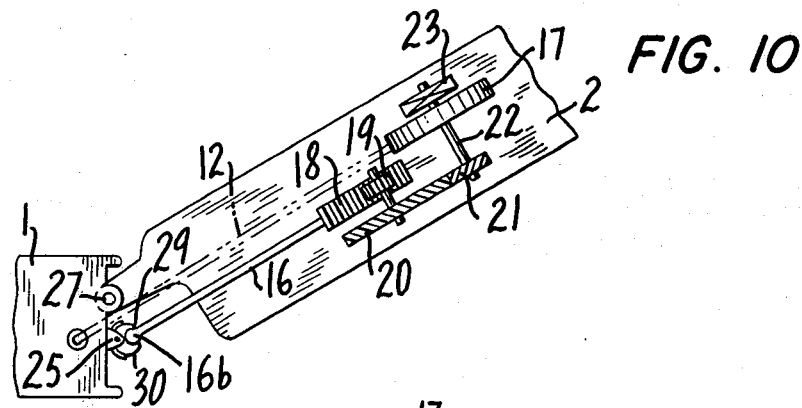
Figure 11:
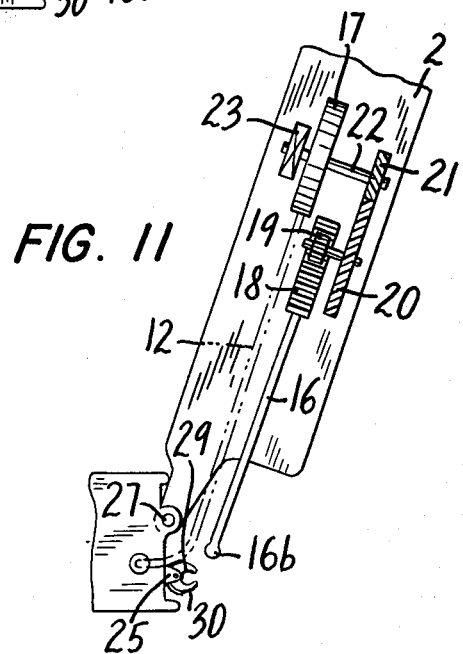

The passive occupant belt restraint system shown in FIG. 1 includes a shoulder belt 3 which extends across a vehicle seat 10 between an emergency locking retractor 9 on the inboard side of the seat and a belt transfer guide 6 received in a track 13 affixed to the vehicle roof 11 above the vehicle door 2. A transfer guide ring 8 sewn to the outboard end of the belt 3 is releasably secured to an emergency release buckle 7. The belt transfer guide 6 moves the belt 3 between an occupant-releasing configuration near the front post 14 (FIG. 1) and an occupant-restraining configuration (solid lines of FIG. 2) at the rear end of the track 13 near the center pillar 4 of the vehicle body 1. A locking device 5 at the rear end of the track 13 locks the belt transfer guide 6 in place when the belt is in the restraining configuration.

The belt transfer guide 6 is attached to one end of a drive wire 12 which extends from the track through the front pillar 14 of the automobile body 1 and is coupled at its other end to the output 17 of a motion amplifier 15 mounted in the vehicle door 2.

An input rod 16 is coupled at one end of an input 19 of the motion amplifier 15, and its other end selectively engages a coupling mechanism 24 (FIG. 2) on the vehicle body 1 to transmit door opening motion to the motion amplifier, and thereby move the belt transfer guide 6 between the restraining and releasing positions only when the door is between closed and partway opened positions. The coupling 24 releases the rod 16 when the door 2 is between partway open and fully open positions, such that door movement does not actuate the motion amplifier 15.

The end of the rod 16 coupled to the amplifier 15 has a rack gear 18 which engages a first pinion 19, concentric to and rotatable with a first large gear 20. The first large gear 20 drives a second pinion 21 on a common shaft 22 with the output take-up reel 17, which, in turn, engages the drive wire 12. The output 17 may be a gear, and the wire 12 a racked wire. A spiral torsion spring 23 (which is optional) attached to the output shaft 22 stores energy when the door is closed and returns the stored energy when the door is opened to assist in driving the belt transfer device.

When the door is closed (solid lines FIG. 2), the belt transfer guide 6 resides above and behind the passenger, and the shoulder belt 3, which extends across the seat 10, is pulled to an inboard position by the retractor 9. The input rod 16 engages the coupling mechanism 24, 25, 26 such that door opening movement pulls the rod 16 away from the amplifier 15. As the rod 16 is pulled, the rack gear 18 drives the input pinion 19 and large gear 20, the large gear 20 drives the second pinion 21 and output reel 17, and the output reel 17 draws the wire 12 to move the belt transfer guide 6, along the track 13, to the occupant-releasing position (phantom lines, FIG. 2). Correspondingly, door closing movement causes the rod 16 and rack gear 18 to be pushed into the amplifier and the amplifier gears to rotate to drive the wire 12 and belt transfer guide 6 back to the restraining position.

In accordance with the present invention, the amplifier 15 moves the belt transfer guide 6 completely from the restraining position to the releasing position when the door is moved from closed to partway open, and vice versa. Accordingly, the amplifier 15 (attached to the door) is coupled to the vehicle body 1 through the input rod 16 only when the door 2 is between closed and partway open positions. The input rod 16, and thereby the amplifier 15, is not coupled to the vehicle body 1 when the door 2 is between partway open and fully open positions, such that door opening and closing motions are not transmitted to the amplifier 15.

In one embodiment of an input rod 16 and coupling mechanism 24 in accordance with the present invention, the rod 16 has a tenon 16a which engages a cooperating latch 24a on the coupling mechanism 24. The coupling mechanism 24, in turn, is attached to a mounting plate 25 on the vehicle body 1.

As the door is moved between the closed position (FIG. 4) and a partway open position (FIG. 5), the rod 16 remains coupled to the door through the coupling mechanism 24, and transmits the door opening movement to the motion amplifier. When the door has reached partway open (FIG. 5), the rod 16 has pivoted relative to the coupler 24 to an angle in which the tenon 16a moves out of engagement with the latch 24a. As the door is moved between its partway open (FIG. 5) and fully open (FIG. 6) positions, the rod 16 swings from the coupler 24 and inparts no further input to the motion amplifier 15. Correspondingly, when the door is closed, the door pivots freely between its fully open position and partway open position. Upon reaching the partway open position (FIG. 5), the tenon 16a of the rod 16 once again engages the coupler 24 to transmit further closing motion of the door 2 to the motion amplifier 15, and move the belt transfer guide 6 back to its restraining position.

As shown in FIG. 3, the coupler mechanism 24 is pivotally attached to the vehicle body 1 on the mounting plate 25, and movable between a normal position (solid lines) to an emergency release position (phantom lines) against the force of a spring 26. In a situation where the belt transfer mechanism or motion amplifier are damaged and inoperable, the vehicle door may nevertheless be opened. Door opening force pulls the rod 16 away from the coupler 24, causing the coupler 24 to pivot against the spring 26, permitting the rod 16 to be released from the latch 24a.

Another embodiment of a coupler mechanism is illustrated in FIGS. 7-11. A tenon 16b at the end of the rod 16 engages a pair of opposed claws 29, 30, urged together by a spring 31 mounted on a shaft 28 carried by bearings 33. The coupler mechanism is received in a spring 32 attached to a mounting plate 25 on the vehicle body for holding the coupler mechanism in a normal angular position.

When the door is moved between closed (FIG. 9) and partway open (FIG. 10), the jaws 29 and 30 of the coupler mechanism retain the rod 16 so that the opening movement of the door is transmitted to the motion amplifier to move the belt from the restraining to the releasing position. When the door has reached a partway opened position (FIG. 10), and the rod 16 is at approximately a 30° angle, the jaws 29 and 30 release the tenon 16b, and the rod 16 is free to pivot away from the coupler as the door is fully opened. Conversely, as the door is closed, when it reaches the partway closed position (FIG. 10), the tenon 16b of the rod 16 is received in the jaws 29 and 30 of the coupler mechanism, and thereafter further door closing is transmitted through the rod 16 to the motion amplifier.

In another embodiment of a coupler mechanism in accordance with the present invention, (FIGS. 12-13), an input rod 116 has a pin 116a at one end for engaging the coupler mechanism 124, and a rack gear 118 at its other end for driving the motion amplifier (not shown). The coupler mechanism 124 is a yoke pivotally attached at one end 127 to the vehicle body 1, and held at its other end by a spring 126 engaging one of the prongs. The other prong 124a receives the pin 116a when the door is between its closed and partway opened position.

Figure 12:
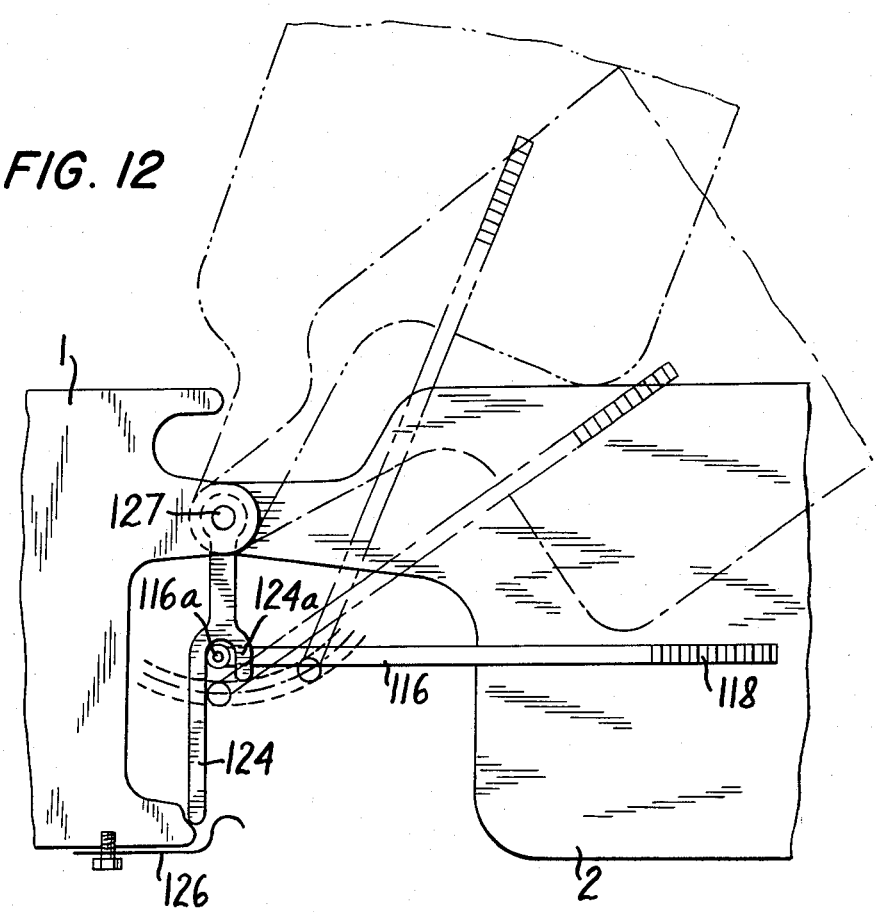
FIG. 12 illustrates another embodiment of an input rod and coupling mechanism, shown in various stages of door opening and closing movement.

Referring to FIG. 12, when the door is closed, (solid lines), the pin 116a of the rod 116 is received in the yoke 124. As the door is moved from its closed position to a partway opened position (dash-dotted line configuration), the pin 116a is held by the one prong 124a of the yoke 124 so that opening movement of the door is transmitted to the motion amplifier to move the belt from its restraining to releasing position. When the door has reached a partway opened position, the pin 116a pivots out of the yoke, and thereafter, upon further opening movement of the door to its fully opened position (dash-double dotted line configuration), the pin 116a pivots along an arc away from the yoke 124. Conversely, when the door is closed, upon reaching a partway closed position, the pin 116 engages the yoke, and further door closing movement is transmitted to the motion amplifier to move the belt back to the restraining position.

Figure 13:
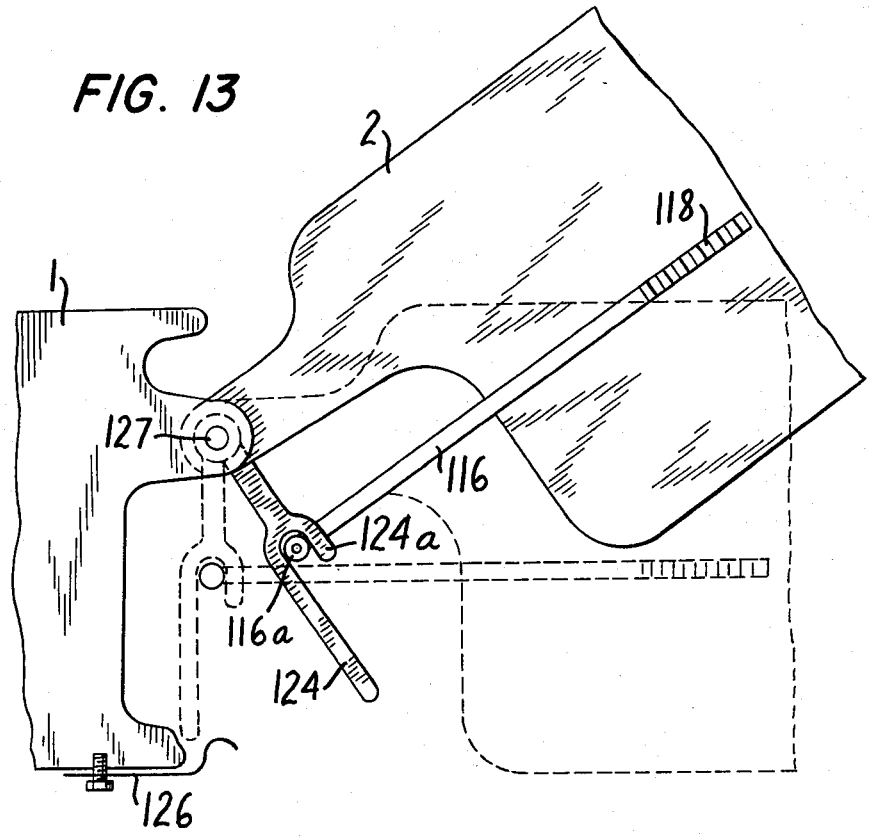
FIG. 13 illustrates the emergency release of the coupling mechanism shown in FIG. 12, shown during two stages of door opening movement.
Figure 14:
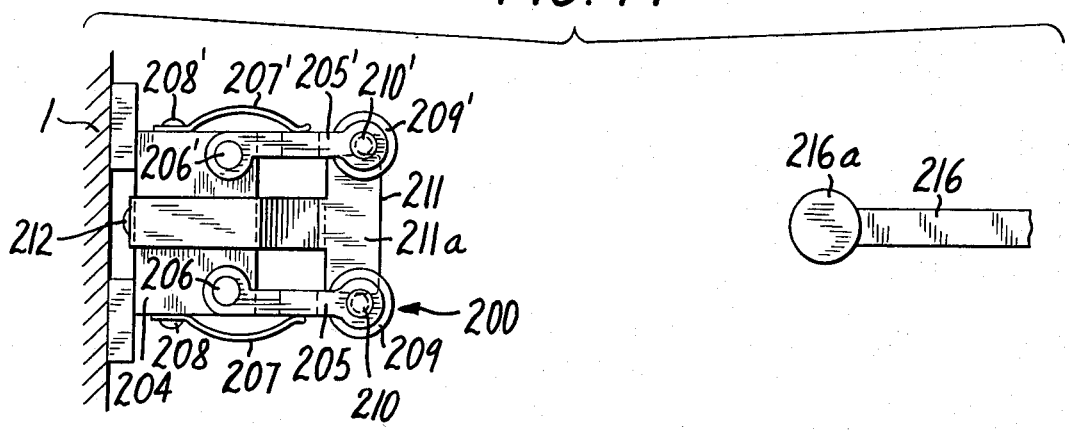
FIGS. 14 and 15 represent top and side schematic views, respectively, of another embodiment of an input rod and a coupling mechanism in accordance with the present invention.
Figure 15:
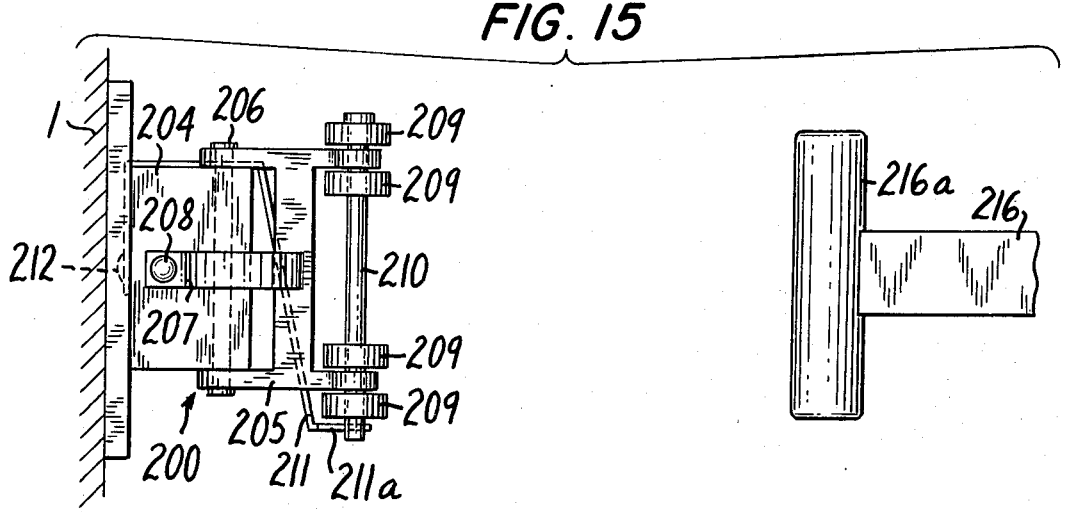

FIG. 13 represents the operation of the coupler mechanism 124 when the motion amplifier or belt transfer mechanism has been damaged and is inoperable. As the door is opened from its closed position (phantom lines), since the input pinion of the motion amplifier is unable to rotate, the pin 116a pulls against the one prong 124a of the yoke 124. Door opening movement is not prevented, however, since the entire coupler 124 releases from the spring 126 and is thereafter free to pivot about 127.

Another embodiment of an input rod 216 and coupler mechanism 200, in accordance with the present invention, is illustrated in FIGS. 14-19. The input rod 216 has a cylindrical enlarged end 216a, which is received in a coupler 200 with opposed capturing rollers 209, each set of rollers 209, 209' being mounted on a shaft 210, 210'. The shafts 210 and 210' are supported by arms 207, 207' pivotable toward and away from each other about pivot points 206 and 206', representing the locking and releasing positions, respectively, of the coupler 200. A pair of springs 207, 207', attached to the body 204 of the coupler 200 by screws 208, 208', bear on the arms 205, 205' to urge the rollers 209 together toward the locking position.

Figure 16:
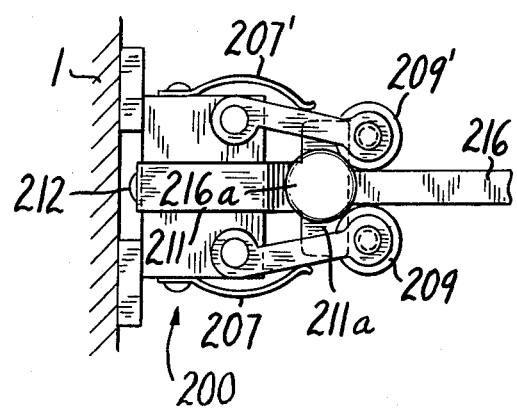
FIG. 16 is a top schematic view of the rod and coupling mechanism of FIGS. 14 and 15 in the engaged state.
Figure 17:
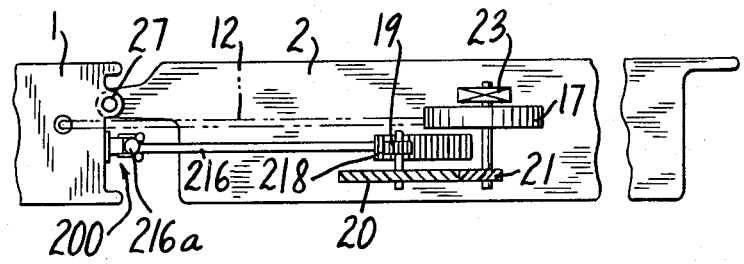
FIGS. 17-19 are schematic illustrations of the rod and coupling mechanism of FIGS. 14-16 during various stages of door opening and closing movement.
Figure 18:
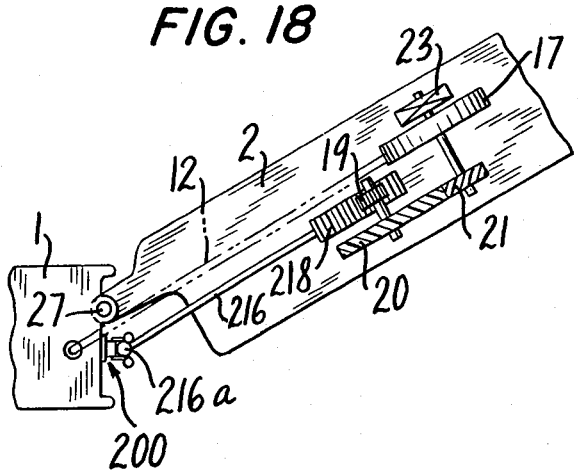
Figure 19:
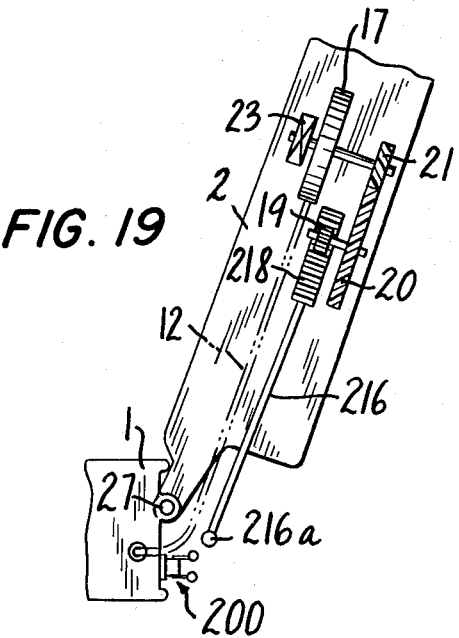

A Z-spring 211 is also attached to the body 204 of the coupler 200, such as by a screw 212, and extends diagonally downward behind the sets of rollers 209, 209' in the receiving space for the rod 216. The spring 211 has a bottom spacer plate 211a of laterally enlarged cross section for keeping the shafts 210, 210', and thereby the rollers 209, 209' apart when the enlarged end 216a is retracted from the coupler 200, as is the case in FIGS. 14 and 15. When the rod 216 is inserted back into the coupler 200, however, the enlarged end 216a pushes the spring 211 backwards into the coupler which moves the plate 211a out of engagement with the shafts 210, 210' and permits the rollers 209, 209' to close around the cylindrical portion 216a, as shown in FIG. 16. Conversely, when the rod 216 retracts from the coupler 200, the spring 211 urges the plate portion 211a back up between the shafts 210, 210' to keep the rollers 209, 209' apart.

When the door is moved from closed (FIG. 17) to partway open (FIG. 18), the enlarged end 216a of the rod 216 is locked in the coupler 200, and door movement is transmitted to the amplifier input 19 to move the belt transfer mechanism from the restraining to releasing position.

When the door 2 has reached partway open (FIG. 18), the rod 216 disengages from the coupler 200, and the door is free to open to its fully opened position (FIG. 19) without further actuating the motion amplifier. As the cylindrical end portion 216a retracts from the coupler 200, the spring 211 forces the plate 211a between the shafts 210, 210', and the rollers 209, 209' remain apart. When the door is again closed, the enlarged end 216a of the rod 216 engages the spring 211 between the open rollers 209, 209' to retract the plate 211a from between the rollers. The springs 207, 207' thereafter cause the rollers 209, 209' to close around the enlarged end 216a and lock the rod 216 in the coupler 200.

The above described embodiments of the invention are merely illustrative. Variations and modifications will be apparent to those skilled in the art without departing from the inventive concepts disclosed herein. For example, while as illustrated the amplifier 15 is attached to the door, and the coupler 24, 124, or 200 attached to the vehicle body, the mounting is reversible without affecting the operation of the device. All such modifications and variations are intended to be within the scope of the present invention, as defined in the following claims.

I claim:

1. In a passive occupant restraint belt system for vehicles having a body and a door, the system including a restraining belt, apparatus for moving the belt from an occupant-restraining to an occupant-releasing position in response to partial opening of the door of the vehicle comprising belt transfer means engaging the belt for moving the belt from the restraining to the releasing position and motion transmission means coupled to the belt transfer means for transmitting and amplifying opening motions of the door to the transfer means, the transmission means including a motion amplifier mounted on one of the vehicle body and door, and a force transmitting input member having one end coupled to an input component of the motion amplifier, the improvement comprising coupling means for connecting the other end of the input member to the other of the vehicle body and door when the door is between closed and partway opened positions for transmitting door opening and closing movements to the motion amplifier to move the belt between its restraining and releasing positions, and for releasing the other end of the member from the door or vehicle body when the door is between partway opened to fully opened.

2. The improvement according to claim 1, wherein the coupling means comprises a tenon on the end of the input member and a coupler attached to the vehicle door or body including a latch means for engaging the tenon when the door is between the closed and partway open position, and for permitting the tenon to pivot away from the latch when the door is between the partway open and fully open positions.

3. The improvement according to claim 1, wherein the coupling means comprises a tenon on the end of the input member, and a coupler attached to the vehicle door or body and having a pair of spring loaded spaced apart jaws for receiving the tenon and holding the tenon when the door is between its closed and partway open positions, and for releasing the tenon when the door is between the partway open and fully open position.

4. The improvement according to claim 1, wherein the coupling means comprises a pin on the end of the input member and a coupler comprising a yoke attached to the other of the vehicle body or door, and arranged to engage the pin when the door is between the closed and partway open position to transmit door movement to the amplifier, but to permit the pin to retract from the yoke when the door is between its partway open and fully open positions.

5. The improvement according to claim 1, wherein the coupling means comprises a coupler having a pair of receiving members pivotable toward and away from each other between locking and releasing positions, an enlarged end portion on the input member receivable in the coupler between the receiving members, wherein the input member is captured in the coupler when the receiving members are in the locking position, means for urging the members toward the locking position, and spacer means for maintaining the receiving members apart when the enlarged portion is retracted from the coupler.

6. The improvement according to claim 5, wherein the coupler comprises a Z-spring having a spacer portion at one end thereof, the spring disposed in the coupler to engage the enlarged end of the rod for moving the spacer portion between a first position for maintaining the receiving members apart when the rod is retracted from the coupler and a second position for permitting the receiving members to pivot to the locking position when the rod is inserted into the coupling.

7. The improvement according to claims 1, 2, or 4, further comprising an emergency release means for disconnecting the input member from the coupling means when the belt transfer mechanism or amplifier is inoperable.

8. The improvement according to claim 7, wherein said release means comprises means for pivotally mounting said coupling means on said other one of said body and said door and spring means for retaining said coupling means in a fixed position during normal opening and closing movement of the door, and for releasing the coupling means to pivot in emergency situations for releasing the input member from the coupling means to permit the door to freely open.

* * * * *